Dec. 6, 1927.

L. SANGUINETTI

COOKER

Filed March 31, 1927

1,651,730

INVENTOR
Louis Sanguinetti
John A. Raismith
ATTORNEY

Patented Dec. 6, 1927.

1,651,730

UNITED STATES PATENT OFFICE.

LOUIS SANGUINETTI, OF SAN JOSE, CALIFORNIA.

COOKER.

Application filed March 31, 1927. Serial No. 179,899.

This invention relates particularly to that type of cookers used in the cooking and sterilizing of canned goods.

It is one object of the invention to provide a cooker whereby the cans may be cooled under pressure subsequent to the cooking process, thereby preventing bursting of the cans.

It is another object of the invention to provide a cooker of the character indicated whereby the cans may be handled and operated upon individually thereby eliminating most of the friction ordinarily developed in those cookers where the cans are fed through a single chamber.

It is also an object of the invention to provide a device of the character indicated that will be simple in construction, economical to manufacture, and highly efficient in its practical application.

Figure 1:
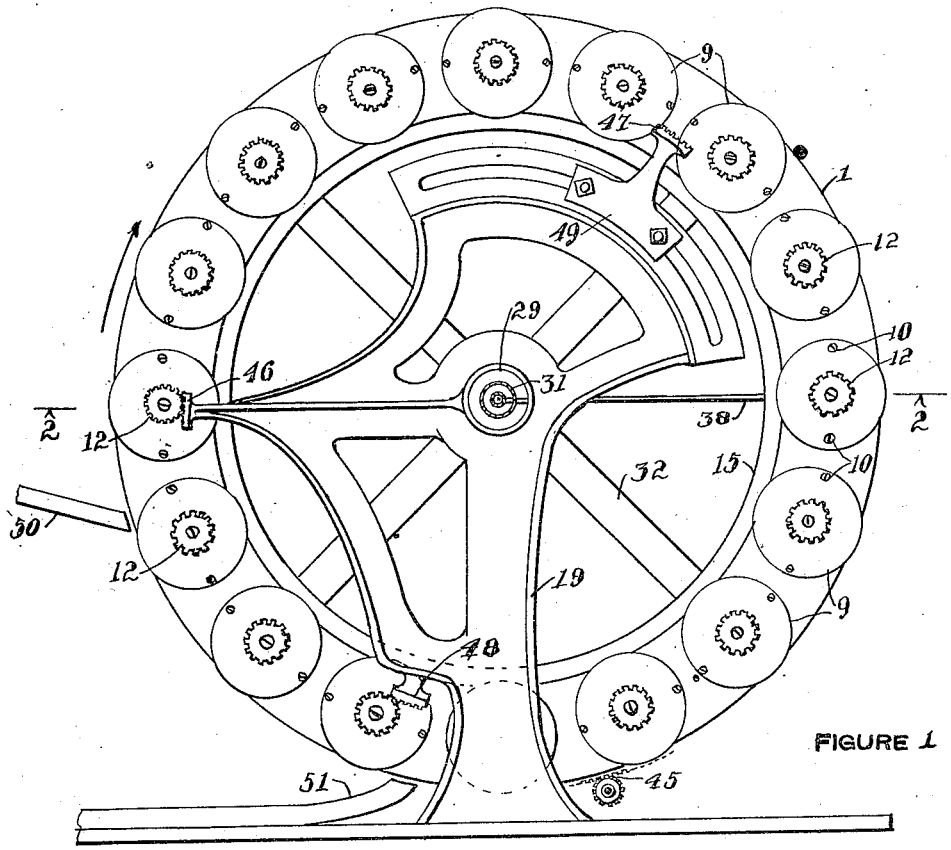
Figure 1 is a side elevation of a cooker embodying my invention.
Figure 2:
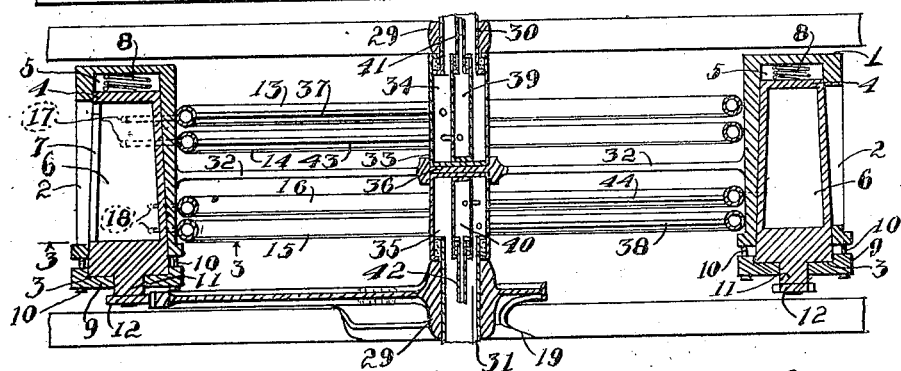
Figure 2 is a sectional view on line 2—2 of Figure 1.
Figure 3:
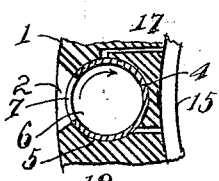
Figure 3 is a sectional view on line 3—3 of Figure 2.

Referring now more particularly to the drawing, I show at 1 an annular element having a plurality of conical chambers formed therein at right angles to the plane thereof and adjacent its outer perimeter with which each chamber communicates by means of a slot 2. The larger end of the chamber communicates with the exterior of the element by means of an opening 3.

At 4 I show a plug fitting snugly in chamber 5 and adapted to rotate therein, and provided with a chamber 6 having a single opening therein as at 7 adapted to register with the opening 2. A spring 8 is inserted between the smaller end of plug 4 and the adjacent end of chamber 5, and the plug is held in place in chamber 5 by means of a collar 9 fitting over its outer end and adjusted by means of screws 10 passing through the collar and engaging the element 1. A pin 11 projects from the outer end of plug 4 through collar 9 and is fitted with a spur gear 12. By means of this construction the plug may be rotated in the chamber 5 to bring openings 7 and 2 into alignment at desired intervals, and a snug fit may be maintained between the plug 4 and the wall of chamber 5 by manipulating screws 10.

At 13, 14, 15, 16 are shown conduits encircling the inner periphery of the element 1. The conduits 13 and 14 communicate with each chamber 5 at a given point as 17, and the conduits 15, 16 communicate with each chamber at a given spaced distance from the said conduits 13 and 14 as shown at 18. The arrangement of the openings 2 and 7 and conduits 17 and 18 is such that when the plug 4 is rotated in the direction indicated by the arrow 19 the opening 7 will move out of communication with opening 2 and into communication with conduits 17, then out of communication with conduits 17 and into communication with conduits 18, and then out of communication with conduits 18 and into registration with opening 2.

A suitable supporting frame for the structure is shown at 19 with bearings at 29 supporting fixed conduits 30 and 31 aligning with the axis of rotation of the element 1. A hollow hub connected to element 1 by spokes 32 is shown at 33 and divided into two chambers 34 and 35 by a partition 36. The ends of this hub are journaled in the fixed conduits 30 and 31 as shown. Connecting conduit 13 with chamber 34 is a conduit 37, and connecting conduit 15 with chamber 35 is a conduit 38.

Axially mounted in each chamber 34 and 35 and to revolve therewith is a smaller chamber as 39 and 40, and each of these smaller chambers is journalled in fixed conduits as 41 and 42. The conduit 30 communicates with a source of steam under pressure, not shown, and the conduit 41 is an exhaust for the same. The conduit 31 communicates with a source of cooling air under pressure, and the conduit 42 is an exhaust for the same. When the chamber 6 registers with conduits 13 and 14 at 17 then steam under pressure flows through 30, 34, 37, 13, 17 into closed chamber 6, thence through 14, 43, 39, 41. A restricted passage is provided for the exhaust because its principal function is to permit a quick movement of the steam into all of the chambers.

When the chamber 6 is moved into registration with the conduits 15 and 16 at 18, then cooling air or other fluid is introduced under pressure, flowing through 31, 35, 38, 15, 18 into chamber 6, thence through 16, 44, 40 and 42.

The annular element 1 may be rotated in any suitable manner as by a rack and pinion 45, and the several gears 12 are operated at desired intervals by means of segmental gears 46, 47 and 48 mounted on support 19. The gear 47 is adjustably mounted in support 19 as indicated at 49 for the purpose hereinafter set forth. Any suitable means is provided for introducing cans into the machine as indicated at 50, and a suitable receiving means is positioned at 51.

Assuming now that the device is in full operation with a supply of cans being fed into the machine at 50, where openings 2 and 7 are in register. The rotation of element 1 moves each spur gear 12 into engagement with gear 46 thereby rotating the part 4 a distance to bring opening 7 into registration with conduits 17, and admitting steam under pressure into the chamber 6, as above described. The cooking process continues until the gear 12 engages gear 47 whereupon the part 4 is rotated a distance to bring the opening 7 into registration with conduits 18, whereupon the steam is driven out and replaced with a cooling fluid as hereinbefore described. The cooling process continues until the gear 12 engages gear 48, whereupon the part 4 is again rotated a distance until openings 7 and 2 are again in register and the can permitted to discharge therethrough.

It may now be readily seen that when a can has been introduced into a chamber 6 it may be subjected to the cooking operation for any desired length of time by suitable adjustment of the gear 47, or variation in the speed of rotation of the element 1, or both. This process may be followed by any desired period of cooling under pressure, thereby eliminating the bursting of cans, a matter of frequent occurrence when cans are discharged directly from a cooker into the atmosphere, and greatly reducing the time over those methods where the cans are removed from a cooker and passed through a cooling chamber.

It may be further pointed out that by means of this construction desired results may be obtained with much less steam or cooking fluid than required in the cookers formerly used, and the steam may be used at much higher pressures, thereby materially shortening the time of cooking.

It is to be understood, of course, that while I have herein shown and described but one specific embodiment of the invention, changes in form, construction and method of assembly and operation may be made within the scope of the appended claims.

I claim:

1. In a cooker of the character described, a revoluble housing and a processing chamber revolubly mounted therein, and means for effecting the rotation of the chamber relative to the housing at predetermined periods, said chamber and housing having registrable openings formed therein adapted to permit the passage of cans therethrough, and means for successively introducing a cooking fluid and then a cooling fluid into said chamber between the said periods of relative rotation.

2. In a cooker of the character described, a revoluble housing having a passage for cans formed therein, a cooking-fluid port formed therein in spaced angular relation to said passage, a cooling-fluid port formed therein in spaced angular relation to said first port, and a processing chamber mounted for intermittent rotation in said housing and having a can passage formed therein adapted to communicate successively with said passage and ports.

3. In a cooker of the character described, a revoluble housing having a passage for cans formed therein, cooking-fluid inlet and exhaust ports formed therein in spaced angular relation to said passage, cooling-fluid inlet and exhaust ports formed therein in spaced angular relation to said first ports, and a processing chamber mounted for intermittent rotation in said housing and having a can passage formed therein adapted to communicate successively with said passage and said cooking-fluid ports and cooling-fluid ports.

4. In a cooker of the character described, a revoluble housing having a tapered chamber formed therein and having a can passage formed therein at right angles to said chamber, and having a cooking-fluid conduit and a cooling-fluid conduit passing therethrough in spaced angular relation to said passage and to each other, and a processing chamber adjustably mounted for intermittent rotation in said first chamber and having a can passage formed therein and adapted to communicate successively with said passage and conduits.

5. In a cooker of the character described, a revolubly mounted housing having a plurality of processing chambers revolubly mounted therein adjacent its periphery and having a can passage formed therein adjacent each chamber, and each processing chamber having a can passage formed therein registrable with the adjacent housing passage, and means for introducing first a cooking fluid and then a cooling fluid into each processing chamber between its periods of registration with said first passage.

6. In a cooker of the character described, a revolubly mounted housing having a plurality of processing chambers revolubly mounted therein and having a can passage formed therein adjacent each chamber, and each processing chamber having a can passage formed therein resistrable with the adjacent housing passage, means actuated by the rotation of said housing for effecting the registration of said passages at predetermined periods, and means for introducing first a cooking fluid and then a cooling fluid into each processing chamber between its periods of registration with said first passage.

7. In a cooker of the character described, a revoluble housing having a can passage formed therein, a processing chamber revolubly mounted in the housing and having a can passage formed therein registrable with said first passage, means for introducing first a cooking fluid and then a cooling fluid into the processing chamber, and means for successively effecting the registration of said passages, then moving the processing chamber into communication with the cooking fluid introducing means and then the cooling fluid introducing means, and then again effecting registration of said passages.

8. In a cooker of the character described, a revoluble housing having a can passage formed therein, a processing chamber revolubly mounted in the housing and having a can passage formed therein registrable with said first passage, means for introducing first a cooking fluid and then a cooling fluid into said processing chamber, means for effecting registration of said passages, adjustable means for moving the processing chamber into comunication with the cooking fluid introducing means and then the cooling fluid introducing means whereby the cooking and cooling periods may be proportionately varied, and means for again effecting registration of said passages.

LOUIS SANGUINETTI.